United States Patent
Kamen et al.

(10) Patent No.: US 6,920,947 B2
(45) Date of Patent: Jul. 26, 2005

(54) EXERCISE MODE FOR A PERSONAL TRANSPORTER DEVICE

(75) Inventors: Dean L. Kamen, Bedford, NH (US); John David Heinzmann, Manchester, NH (US); Jason M. Sachs, Goffstown, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 10/459,334

(22) Filed: Jun. 11, 2003

(65) Prior Publication Data

US 2004/0005958 A1 Jan. 8, 2004

Related U.S. Application Data

(60) Provisional application No. 60/387,944, filed on Jun. 12, 2002.

(51) Int. Cl.$^7$ ............................................... B62D 61/12
(52) U.S. Cl. ..................... 180/7.1; 180/6.5; 180/65.1; 180/218
(58) Field of Search .................... 180/218, 6.5, 65.8, 180/7.1, 65.1, 65.2, 65.3; 482/57, 60, 63, 51

(56) References Cited

U.S. PATENT DOCUMENTS

| | | | |
|---|---|---|---|
| 627,066 A | 6/1899 | Schnepf | |
| 3,062,548 A | 11/1962 | Foster et al. | |
| 3,513,928 A | 5/1970 | Emmons | 180/65 |
| 3,598,195 A | * 8/1971 | Steller | 180/207 |
| 3,713,502 A | * 1/1973 | Delaney et al. | 180/205 |
| 4,867,439 A | 9/1989 | Salyer | 272/70.3 |
| 5,370,200 A | * 12/1994 | Takata | 180/206 |
| 5,941,332 A | * 8/1999 | Dimick | 180/205 |
| 6,203,472 B1 | 3/2001 | McCaffrey et al. | 482/61 |
| 6,302,230 B1 | 10/2001 | Kamen et al. | 180/171 |

FOREIGN PATENT DOCUMENTS

DD 228 451 A1 10/1985

OTHER PUBLICATIONS

Gfohler, et al "Exercise Tricycle for Paraplegics" *Medical and Biological Engineering and Computing*, Peter Peregrinus, Ltd., vol. 36, No. 1, 1998, pp 118–121. ISSN: –0140–0118.

* cited by examiner

*Primary Examiner*—Tony Winner
(74) *Attorney, Agent, or Firm*—Bromberg & Sunstein LLP

(57) ABSTRACT

A personal transporter device and corresponding method of operation are given that utilize an exercise mode. A transporter assembly includes a platform, a ground-contacting module, and a motorized drive. The platform supports a user. The ground-contacting module is connected to the platform. The motorized drive powers the ground-contacting module to drive the assembly in a selected direction over an underlying surface. A controller is coupled to and controlling the motorized drive, and also has an exercise mode for opposing a user-provided human power input with a selected level of resistance. When the device is a dynamically stabilized transporter, the controller also controls the motorized drive so as to dynamically stabilize the transporter assembly.

36 Claims, 4 Drawing Sheets

EXERCISE MODE FOR A PERSONAL TRANSPORTER DEVICE

This application claims the benefit of 60/387,944 field Jun. 12, 2002.

FIELD OF THE INVENTION

The invention generally relates to operating modes for a personal transporter device.

BACKGROUND ART

A "dynamically stabilized transporter," as used here refers to a personal transportation device having a control system that actively maintains the device's stability while the device is in operation. Transporters of this type are described, for example, in U.S. Pat. Nos. 6,288,505 and 6,302,230, the contents of which are incorporated herein by reference. As used herein, the term "dynamically stabilized" refers to a requirement that, absent active control of the device during operation, the device is unstable with respect to fore and aft tipping when it is in an operating position.

A dynamically stabilized transporter is typically highly responsive to user inputs, so that normal operation may require only relatively minor physical motion from a user. Thus, a period of prolonged operation may represent for the user a lengthy time of relatively little physical activity.

SUMMARY OF THE INVENTION

Embodiments of the present invention include personal transporters and corresponding methods of operation that utilize an exercise mode. A transporter assembly includes a platform, a ground-contacting module, and a motorized drive. The platform supports a user. The ground-contacting module is connected to the platform. The motorized drive powers the ground-contacting module to drive the assembly in a selected direction over an underlying surface. A controller is coupled to and controlling the motorized drive, and also has an exercise mode for opposing a user-provided human power input with a selected level of resistance, whether in a dynamically balanced condition or otherwise.

In a further embodiment, the personal transporter device may be a dynamically stabilized transporter, and the controller may further control the motorized drive so as to dynamically stabilize the transporter assembly. In addition or alternatively, the exercise mode may allow the user to provide the human power input by causing movement of the transporter assembly relative to the underlying surface. For example, the user may push or pull from the underlying surface against the transporter assembly. Or the user on the platform may move the transporter assembly alternately in opposing directions so that the transporter assembly maintains a relatively fixed position on the underlying surface. In such an embodiment, the relatively fixed position may be maintained by the controller using a position term variable, a pitch damping term variable, and/or a wheel damping term variable.

The personal transporter device may be operated in a current mode or in a voltage mode. The human power input may be required to be a specified function of the speed of the assembly over the underlying surface, such as the square or other power of the speed. In certain modes, the human power input may act to recharge a transporter device power source. In addition or alternatively, the personal transporter device may convert the human power input into heat. For example, the motorized drive may oppose the human power input, or a component, such as a resistor, may dissipate the heat.

A user seat may be connected to the platform, and a pedal arrangement provided for a seated user to provide the human power input. A user display may provide to the user an indication of at least one of a present state of a transporter device power source, a rate of change of the present state of the power source, a total amount of calories expended by the user, and a present rate of calories being expended by the user.

An embodiment may include a coupling mechanism for coupling the transporter assembly to a separate exercise device. Then, operation of the controller in exercise mode involves opposing a user-provided human power input to the separate exercise device with a selected level of resistance provided by the motorized drive of the personal transporter.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Representative embodiments of the present invention include a personal transporter device and a method of operating such a transporter that includes at least one exercise mode, which allows a user to work against a selected level of resistance provided by the device. Periodic operation in exercise mode may provide the user with a change in travel experience while providing a cardiovascular challenge that may advantageously improve cardiovascular fitness of the user. In addition, in some modes, the work performed by the user may be reconverted into an energy input for the power source of the transporter, acting to recharge the power source.

Figure 1:
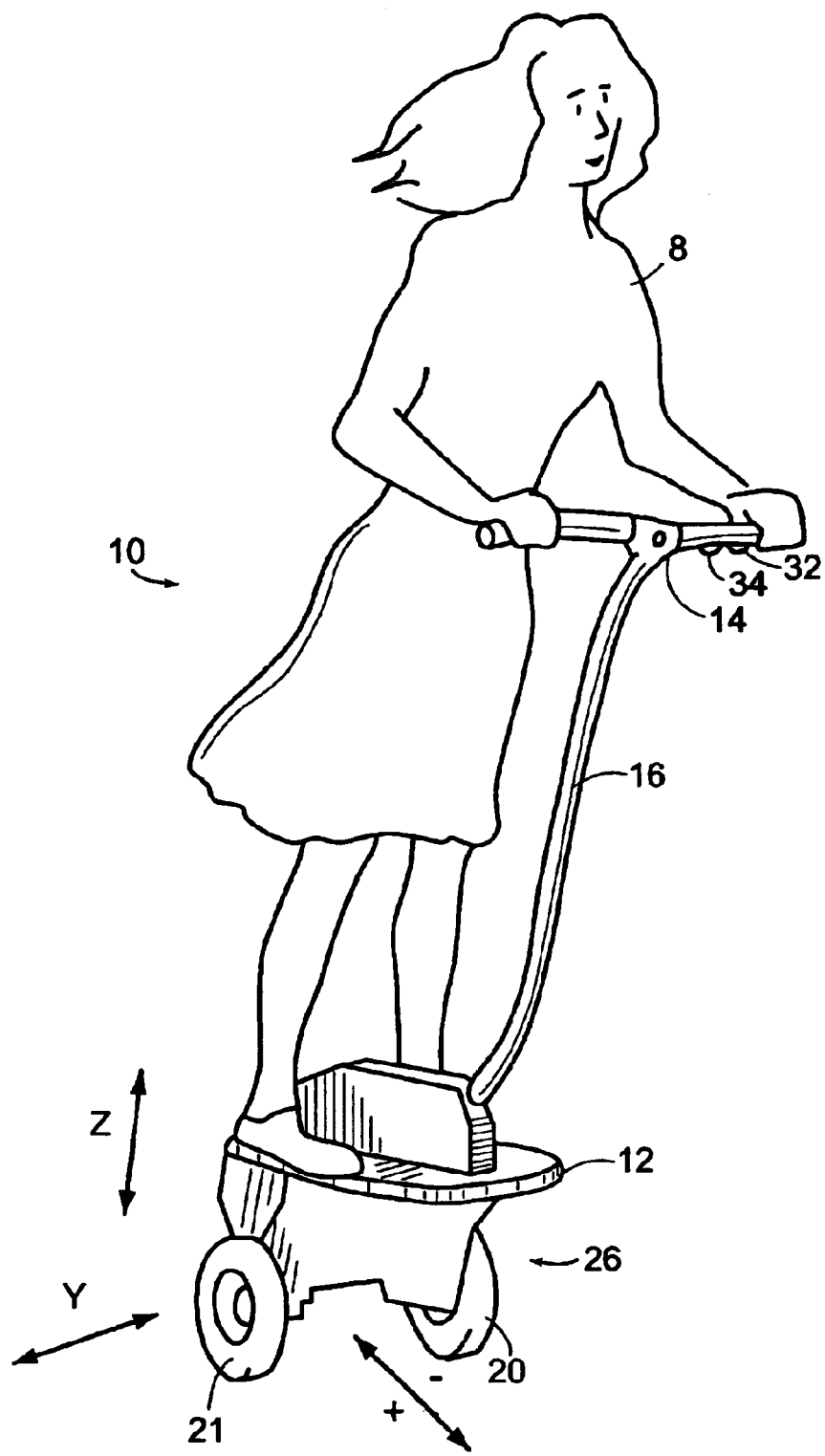
FIG. 1 shows an embodiment of a dynamically stabilized transporter to which the present invention is applicable.

FIG. 1 shows an embodiment of a dynamically stabilized transporter 18 to which the present invention may be applied. Dynamically stabilized transporters are manufactured and marketed by Segway LLC of Manchester, N.H. As to the transporter 18, a user 10 stands on a support platform 12, holding hand grip 14, which is connected to the platform by a handle 16. Although the transporter 18 may be inherently unstable in an un-powered state, a control loop process balances the transporter over a pair of coaxial wheels, 20 and 21. In response to relatively minor movements by the user, the transporter 18 can accelerate, maintain speed, turn, decelerate, stop, etc. Further details regarding the principles and operation of such a transporter 18 are provided in U.S. Pat. No. 6,302,230, which is incorporated herein by reference.

Figure 2:
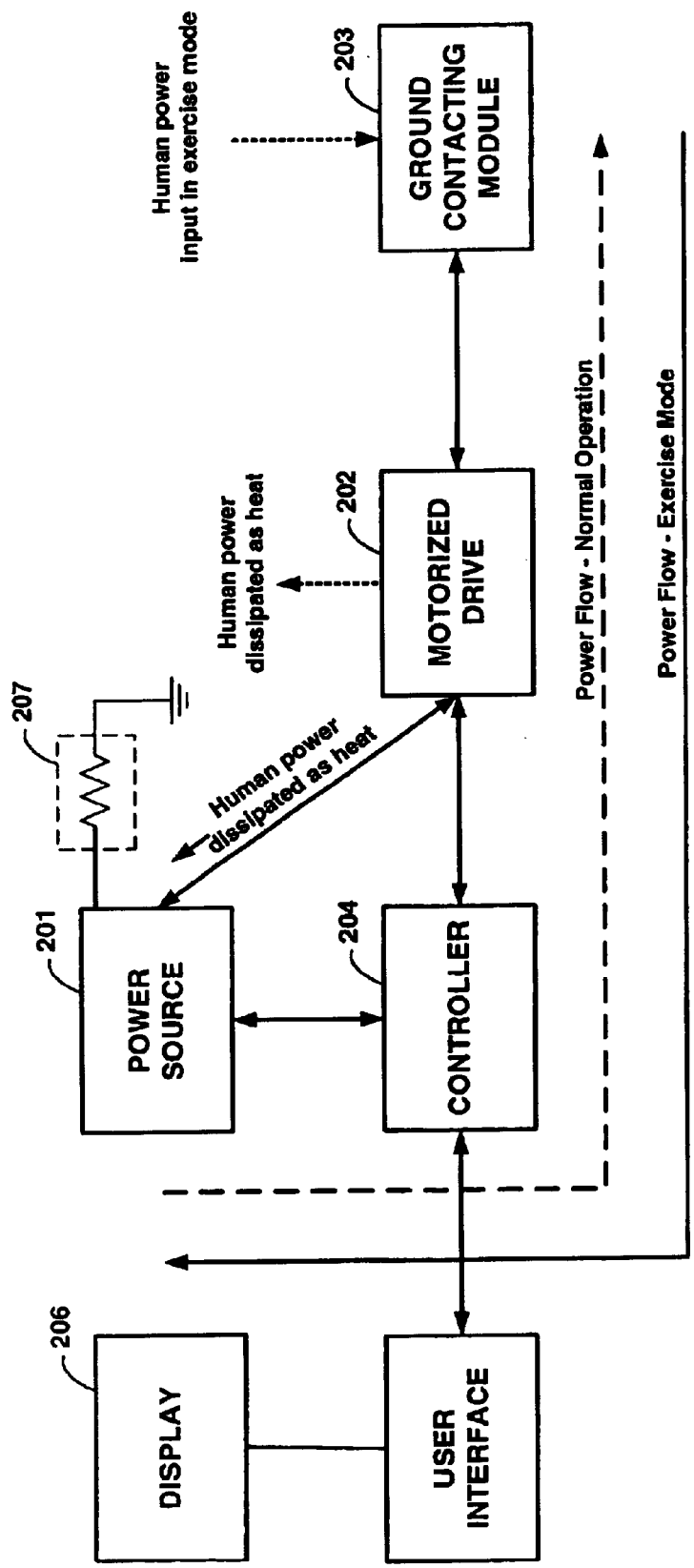
FIG. 2 shows various functional blocks in a dynamically stabilized transporter having an exercise mode according to one embodiment of the invention.

FIG. 2 is a block diagram of an embodiment of a dynamically stabilized transporter having an exercise mode in accordance with the present invention. In normal transport mode, a controller 204 controls a power source 201 and a motorized drive 202. The motorized drive 202 is connected to a ground-contacting module 203 that uses wheels 20 and 21 or other ground-contacting members to drive the transporter 18 over an underlying surface.

The controller 204 receives multiple inputs from various sensors and from the user. Based on its inputs, the controller 204 controls power from the power source 201 to the motorized drive 202 to dynamically stabilize the transporter 18 and provide it with a desired motion as directed by the user. As shown in FIG. 2, power from the power source 201 may be applied directly to motorized drive 202, or may be modulated by controller 204. Typically, controller 204 uses a control algorithm that emulates variable terms such as pitch, position, wheel speed, wheel damping, pitch damping, etc. and thereby gives a user an impression that may vary from actual operating conditions of the transporter.

Dismounted Exercise Mode

To support an exercise mode, the transporter 18 provides a user interface 205, typically one or more devices on or near the hand grip 14. The user interface 205 enables and controls an exercise mode of controller 204. The exercise mode allows the user to dismount from the platform 12 and work against the driving action of the ground-contacting module 202 at a selected level of user exertion by either pushing or pulling the transporter 18. Thus, as shown in FIG. 2, during the exercise mode, power flows in the opposite direction from when the transporter is in normal operation.

In a dismounted exercise mode, controller 204 causes the motorized drive 202 to drive the wheels of the ground-contacting module 203 against the user's efforts based on the input from the user interface 205. For example, the user interface 205 may include a turnable hand grip 14 that controls the speed of the wheels, and the user turns the hand grip 14 to increase or decrease the user's work load, as described in U.S. patent application Ser. No. 10/308,888, filed Dec. 3, 2002, entitled "Security Features for a Personal Transporter," and incorporated herein by reference. Besides turning the hand grip 14, the user could also increase or decrease the work load by changing their speed for a given position of the hand grip 14. Alternatively, the user could use methods other than the user interface 205. For example, given the "fly-by-wire" nature of embodiments of the personal transporter disclosed in U.S. Pat. No. 6,302,230, which is incorporated herein by reference, a personal controller key could be used to input pre-set characteristics for dismounted exercise mode.

The transporter 18 may be operated in either a voltage mode or in a current mode. For example, in follow mode as described in U.S. patent application Ser. No. 10/308,888, the transporter 18 may typically be operated in a current mode, so that the torque produced by the wheels is proportional to, or otherwise a function of, the user input command. In exercise mode, the transporter 18 may also be operated in a current mode, but with the current command $I_{cmd}$ set as a function of the motor speed $\omega_{mg}$ in such a way as to produce a desired drag force. For example, $I_{cmd}$ could be set to $-K \cdot \omega_m$ to simulate viscous drag (with drag torque proportional to speed). Alternatively, for example, $I_{cmd}$ could be set as a function of the square of the speed, for example using the equations $I_{cmd} = -K \cdot \omega_m |\omega_m|$ or $I_{cmd} = -K \cdot \omega_m \cdot \sin(\omega_m)$. Alternatively, $I_{cmd}$ could be set to $-K \cdot \omega_m$ for $\omega_m < 0$ and $I_{cmd}$ could be set to 0 for $\omega_m > 0$. This simulates viscous drag for motion in the negative (reverse) direction, with no drag in the positive (or forward) direction, as is typically the case with rowing machines and other exercise equipment.

Typically, a transporter 18 will have some mechanical inefficiencies that result in losses associated with turning the wheels 20 and 21, e.g., friction and electrical resistance losses. Thus, much of the work that user does in exercise mode may be dissipated as heat in the transmissions and motors associated with the ground-contacting module 203. If, however, the user does more work than is absorbed by these losses and inefficiencies (i.e., pushes fast enough and hard enough), that additional work may be returned to the power source 201 (which is generally a group of batteries), acting to recharge it. Alternatively, the user-provided human power input may generate an electric current that is dissipated as heat by a component such as a resistor.

Typical embodiments also include a display associated with the user interface 205. When the controller 204 is in exercise mode, the display may provide useful information such as an estimate of how many calories the user has burned. Of course, such an estimate would be based on an approximation of the amount of work dissipated by the losses and inefficiencies, and would not reflect other effects such as changing elevation as the transporter 18 goes up and down hills. The display may also indicate the rate of calories being burned, the current charge of the power source 201, or the rate of change of the charge of the power source 201.

Dynamically Stabilized Exercise Mode

An embodiment also may allow the user to engage the exercise mode while remaining on the platform 12. For example, the controller 205 may utilize a stabilizing algorithm that allows the user to work the device back and forth while remaining substantially in one place. In this configuration, the transporter 18 sluggishly moves fore-and-aft or side-to-side causing the energy of the motion to be reabsorbed. This may involve adding a position term, pitch damping term, and/or wheel damping term to the stabilizing algorithm employed by the controller 204.

Figure 3:
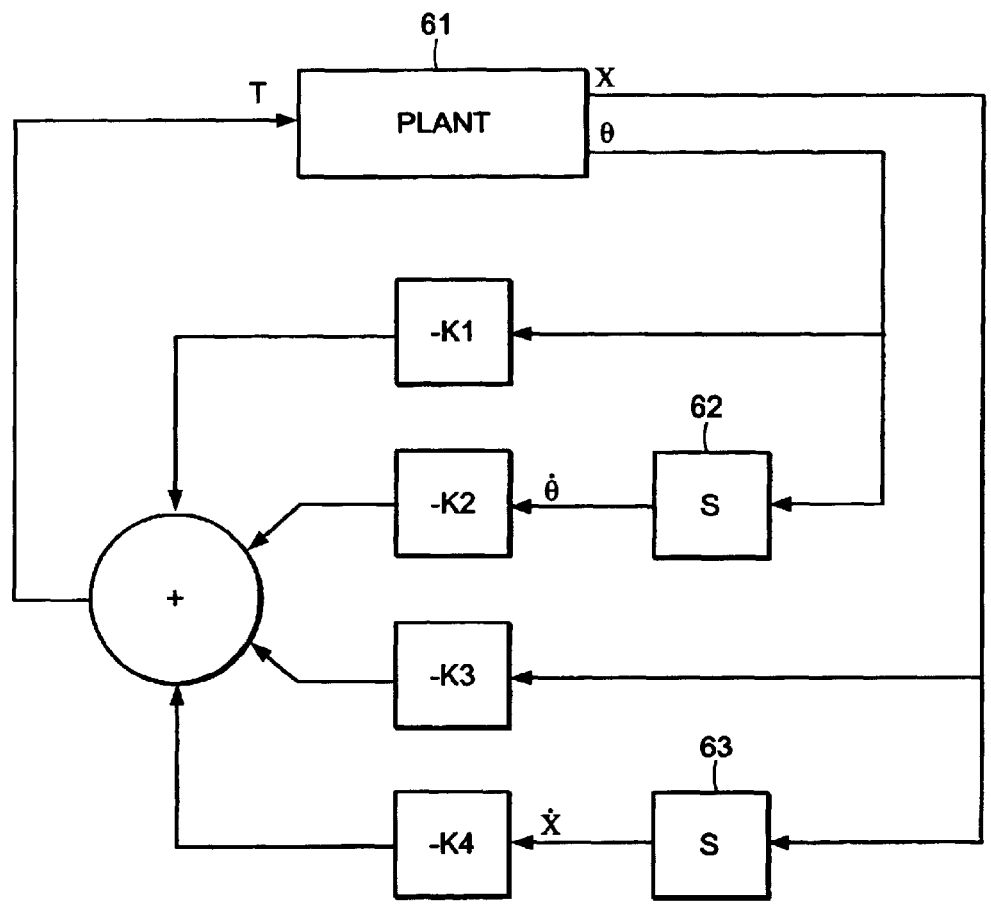
FIG. 3 shows a simplified block diagram of a stabilizing algorithm of a controller having an exercise mode according to one embodiment of the invention.

FIG. 3 is a simplified block diagram of a stabilizing algorithm of a controller 204 having an exercise mode according to one embodiment of the invention. The simplified control algorithm of FIG. 3 maintains stability and also proximity to a reference point on the underlying surface in the presence of disturbances such as changes to the system's center of mass with respect to the reference point on the surface due to body motion of the subject or contact with other persons or objects. Plant 61 is equivalent to the equations of motion of a system with a ground-contacting module 203 driven by a single motor, before a control loop is applied. Wheel torque is shown by the reference T. Boxes 62 and 63 perform differentiation. To achieve dynamic control that insures stability of the system, and to keep the system in the neighborhood of a reference point on the surface, the wheel torque T is governed by the following simplified control equation:

$$T = K_1(\theta - \theta_0) + K_2(\dot{\theta} - \dot{\theta}_0) + K_3(x - x_0) + K_4(\dot{x} - \dot{x}_0),$$

where:

T represents torque applied to a ground-contacting element about its axis of rotation;

θ represents lean of the entire system about the ground contact, with $\theta_0$ representing the system pitch offset;

x represents fore-aft displacement along the under-lying surface relative to a fiducial reference point, with $x_0$ representing a specified fiducial reference offset;

a dot mark over a character denotes a differentiation with respect to time of the variable; and a subscripted variable denotes a specified offset that may be input into the system as described below; and $K_1$, $K_2$, $K_3$, and $K_4$ are gain coefficients that may be configured, either in design of the system or in real-time, on the basis of a present operating mode and operating conditions as well as preferences of a user. These gain coefficients may be positive, negative, or zero, affecting thereby the mode of operation of the transporter device, as discussed below. The gains $K_1$, $K_2$, $K_3$, and $K_4$ are dependent upon the physical parameters of the system and other effects such as gravity. For example, the gain coefficients may be used to model position stiffness, pitch stiffness, pitch damping, or wheel damping so as to implement one or more exercise modes according to an embodiment of the invention.

The effect of $\theta_0$ in the above control equation is to produce a specified offset $-\theta_0$ from the non-pitched position where $\theta=0$. Therefore, adjustment of $\theta_0$ will adjust the transporter device's offset from a non-pitched position. When the controller 204 is engaged in the exercise mode, this pitch offset term may be adjusted to allow user control of the attitude of the transporter. For example, pitch offset may be adjusted by the user by turning hand grip 14, shown in FIG. 1.

Of course, such an adjustable pitch offset is useful under a variety of other circumstances besides an exercise mode, for example, when operating the transporter device on a steep upward or downward incline. Under these circumstances, $\theta_0$ may advantageously be manually offset to allow control with respect to a stationary pitch comfortable to the user.

The size of $K_3$ will determine the extent to which the transporter device will seek to return to a given location. With a non-zero $K_3$, the effect of $x_0$ is to produce a specified offset $x_0$ from the fiducial reference by which x is measured. When $K_3$ is zero, the transporter device has no bias to return to a given location. The consequence of this is that if the transporter device is caused to lean in a forward direction, the transporter device will move in a forward direction, thereby maintaining balance. Thus, by controlling the position term $K_3$ along with the pitch offset term $\theta_0$, an embodiment of the present invention may allow the transporter device to be operated in an exercise mode in which the device moves alternately in opposite directions so as to maintain a relatively constant position.

In order to accommodate two wheels instead of the one-wheel system illustrated for simplicity in FIG. 3, separate motors may be provided for left and right wheels of the transporter 18, and the torque desired from the left and right motors can be calculated separately. Additionally, tracking both the left and right wheel motions permits adjustments to be made to prevent unwanted turning of the vehicle and to account for performance variations between the two ground contacting members or drive motors, as described, for example, in U.S. Pat. No. 6,288,505, issued Sep. 11, 2001.

Other Exercise Modes

Figure 4:
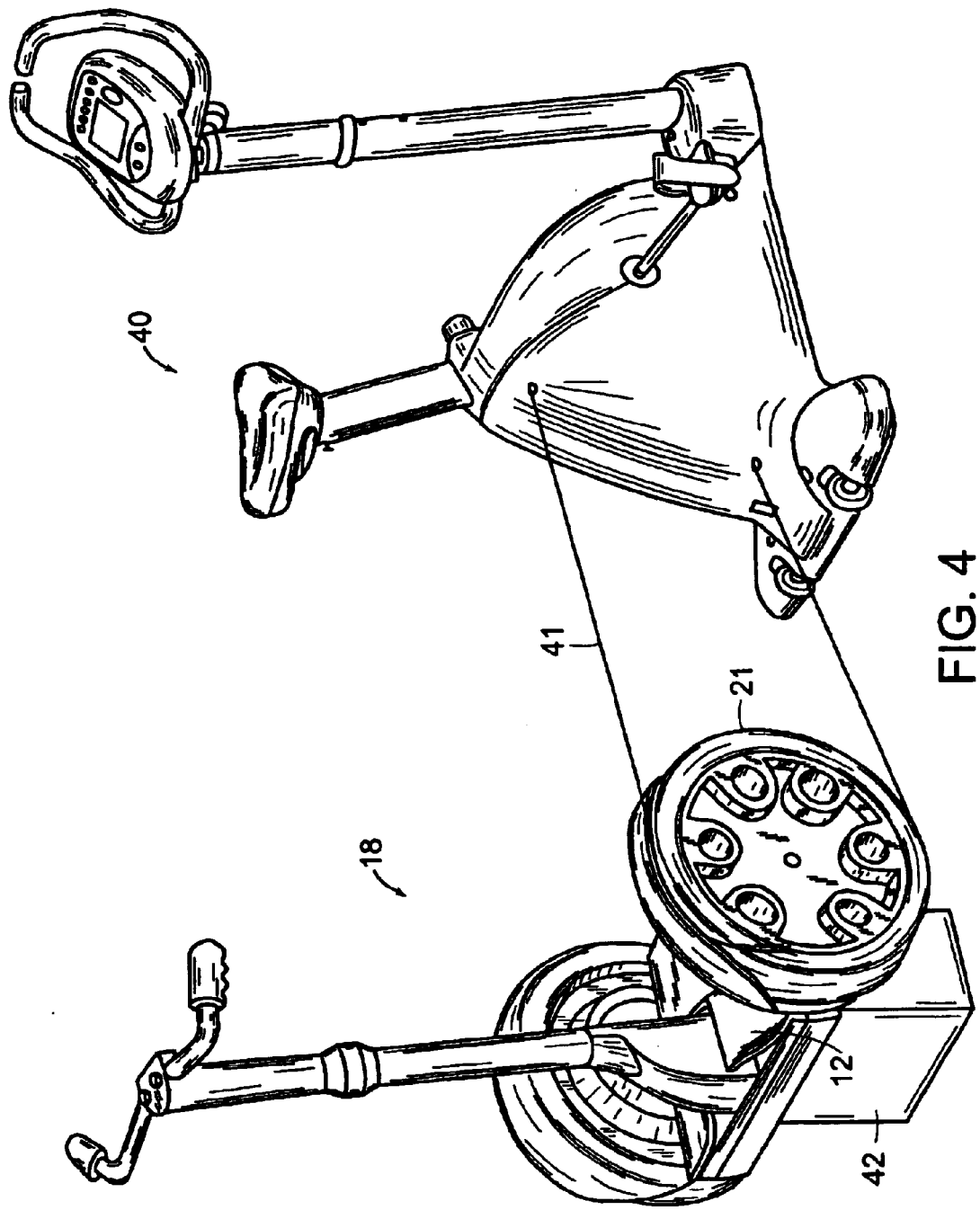
FIG. 4 shows an embodiment in which a dynamically stabilized transporter having an exercise mode is coupled to an exercise bike.

FIG. 4 shows another embodiment of the present invention in which a transporter 18 having an exercise mode is supported above the ground by a platform 42, and coupled to an exercise bike 40. In the embodiment shown in FIG. 4, the coupling mechanism is based on a connecting belt 41 that is fitted around one of the transporter wheels 21, and which connects to the interior mechanical workings of the exercise bike 40. In other embodiments, a direct mechanical coupling such as transmission may connect the transporter 18 to the exercise bike 40. Similar principles can be used to couple an exercise mode transporter to other exercise devices such as stair-climbers, treadmills, elliptical trainers, rowing machines, etc. In addition, an embodiment could couple an exercise mode transporter to a regular bicycle which has its back wheel lifted off the ground.

In such an embodiment, the transporter 18 can be operated in one of the voltage modes or current modes described above so that the ground engaging module 203 provides a torque to the wheel 21 that resists the exercise efforts of a user pedaling on the exercise bike 40. In addition or alternatively, the user's exercise efforts on the exercise bike 40 can be used as described above to recharge the power source 201.

Although various exemplary embodiments of the invention have been disclosed, it should be apparent to those skilled in the art that various changes and modifications can be made which will achieve some of the advantages of the invention without departing from the true scope of the invention. For example, the foregoing description of an exercise mode that resists the user has been provided in the context of a dynamically stabilized transporter, but embodiments of the invention are not limited to such a device and may advantageously be implemented on any personal transporter device.

What is claimed is:

1. A dynamically stabilized personal transporter device comprising:
    a dynamically stabilized transporter assembly including:
        (i) a platform for supporting a user;
        (ii) a ground-contacting module connected to the platform; and
        (iii) a motorized drive for powering the ground-contacting module to drive the assembly in a selected direction over an underlying surface; and
        (iv) a controller coupled to and controlling the motorized drive so as to dynamically stabilize the transporter assembly, and having an exercise mode for opposing a user-provided human power input with a selected level of resistance.

2. A personal transporter device according to claim 1, further comprising:
    a coupling mechanism for coupling the transporter assembly to a separate exercise device, wherein operation of the controller in exercise mode involves opposing a user-provided human power input to the separate exercise device with a selected level of resistance provided by the motorized drive of the personal transporter.

3. A personal transporter device according to claim 1, wherein the exercise mode allows the user to provide the human power input by causing movement of the transporter assembly relative to the underlying surface.

4. A personal transporter device according to claim 3, wherein the exercise mode allows the user to push from the underlying surface against the transporter assembly.

5. A personal transporter device according to claim 3, wherein the exercise mode allows the user to pull from the underlying surface against the transporter assembly.

6. A personal transporter device according to claim 3, wherein the exercise mode allows the user on the platform to move the transporter assembly alternately in opposing directions so that the transporter assembly maintains a relatively fixed position on the underlying surface.

7. A personal transporter device according to claim 6, wherein the controller uses a position term variable to maintain the relatively fixed position.

8. A personal transporter device according to claim 1, wherein a constant current is maintained to the motorized drive.

9. A personal transporter device according to claim 1, wherein a constant voltage is maintained to the motorized drive.

10. A personal transporter device according to claim 1, wherein the controller provides a resistance such that the human power input is required to be a specified function of the speed of the assembly over the underlying surface.

11. A personal transporter device according to claim 1, wherein the controller provides a resistance such that the human power input is required to be a specified function of the square of the speed of the assembly over the underlying surface.

12. A personal transporter device according to claim 1, wherein the human power input acts to recharge a personal transporter device power source.

13. A personal transporter device according to claim 1, wherein the human power input is converted into heat.

14. A personal transporter device according to claim 13, wherein the motorized drive opposes the human power input.

15. A personal transporter device according to claim 13, wherein a component dissipates the heat.

16. A personal transporter device according to claim 1, further comprising:
 a user seat connected to the platform; and
 a pedal arrangement for a seated user to provide the human power input.

17. A personal transporter device according to claim 1, further comprising:
 a user display for providing to the user an indication of at least one of a present state of a transporter device power source, a rate of change of the present state of the power source, a total amount of calories expended by the user, and a present rate of calories being expended by the user.

18. A method of using a dynamically stabilized personal transporter device comprising:
 providing a dynamically stabilized transporter assembly including:
  (i) a platform for supporting a user,
  (ii) a ground-contacting module connected to the platform, and
  (iii) a motorized drive for powering the ground-contacting module to drive the assembly in a selected direction over an underlying surface;
 controlling the motorized drive so as to dynamically stabilize the transporter assembly using a controller having an exercise mode for opposing a user-provided human power input with a selected level of resistance.

19. A method according to claim 18, further comprising:
 providing to the user an indication of at least one of a present state of a transporter device power source, a rate of change of the present state of the power source, a total amount of calories expended by the user, and a present rate of calories being expended by the user.

20. A method according to claim further comprising:
 coupling the transporter assembly to a separate exercise device, and
 wherein controlling the motorized drive in exercise mode involves opposing a user-provided human power input to the separate exercise device with a selected level of resistance provided by the motorized drive of the personal transporter.

21. A method according to claim 18, wherein the exercise mode allows the user to provide the human power input by causing movement of the transporter assembly relative to the underlying surface.

22. A method according to claim 21, wherein the exercise mode allows the user to push from the underlying surface against the transporter assembly.

23. A method according to claim 21, wherein the exercise mode allows the user to pull from the underlying surface against the transporter assembly.

24. A method according to claim 21, wherein the exercise mode allows the user on the platform to move the transporter assembly alternately in opposing directions so that the transporter assembly maintains a relatively fixed position on the underlying surface.

25. A method according to claim 24, wherein the controller uses a position term variable to maintain the relatively fixed position.

26. A method according to claim 24, wherein the controller uses a pitch damping term variable to maintain the relatively fixed position.

27. A method according to claim 24, wherein the controller uses a wheel damping term variable to maintain the relatively fixed position.

28. A method according to claim 18, wherein powering the ground-contacting module includes maintaining a constant current from a transporter power source.

29. A method according to claim 18, wherein powering the ground-contacting module includes maintaining a constant voltage from a transporter power source.

30. A method according to claim 18, wherein the human power input is required to be a specified function of the speed of the assembly over the underlying surface.

31. A method according to claim 18, wherein the human power input is required to be a specified function of the square of the speed of the assembly over the underlying surface.

32. A method according to claim 18, wherein the human power input acts to recharge a transporter device power source.

33. A method according to claim 18, further comprising: converting the human power input into heat.

34. A method according to claim 33, wherein the motorized drive opposes the human power input.

35. A method according to claim 33, wherein a resistor dissipates the heat.

36. A method according to claim 18, further comprising:
 providing a user seat connected to the platform; and
 providing the human power input from a seated user operating a pedal arrangement.

* * * * *